United States Patent [19]

Braid

[11] 4,141,848
[45] Feb. 27, 1979

[54] ORGANIC COMPOSITIONS CONTAINING ESTERS OF ARYL AMINOARYLOXYALKANOLS

[75] Inventor: Milton Braid, Westmont, N.J.

[73] Assignee: Mobil Oil Corporation, New York, N.Y.

[21] Appl. No.: 845,753

[22] Filed: Oct. 26, 1977

[51] Int. Cl.² .................. C10M 1/32; C10M 3/26; C10M 5/20; C10M 7/30

[52] U.S. Cl. .................. 252/51.5 A; 252/56 S; 252/403; 560/74; 560/83

[58] Field of Search .............. 252/51, 5 A, 56 S, 403; 560/74, 83

[56] References Cited

U.S. PATENT DOCUMENTS

| | | |
|---|---|---|
| 2,285,516 | 6/1942 | Knight et al. .................. 560/83 |
| 3,492,234 | 1/1970 | Andress et al. .................. 252/56 |
| 3,493,509 | 2/1970 | Messina .................. 252/51.5A |
| 3,497,181 | 2/1970 | Braid .................. 252/52 |
| 3,573,206 | 3/1971 | Braid et al. .................. 252/51.5 A |
| 3,767,575 | 10/1973 | Braid .................. 252/51.5 A |
| 3,873,459 | 3/1975 | Pawlak et al. .................. 252/51.5 A |
| 3,919,095 | 11/1975 | Okorodudu .................. 252/46.6 |
| 4,002,569 | 1/1977 | Rubin et al. .................. 252/51.5 A |
| 4,017,406 | 4/1977 | Brois et al. .................. 252/51.5 A |

*Primary Examiner*—Irving Vaughn
*Attorney, Agent, or Firm*—C. A. Huggett; Henry L. Ehrlich

[57] ABSTRACT

This specification discloses new compositions of matter, esters of arylaminoaryloxyalkanols, that are useful as antioxidants and organic compositions containing the antioxidants.

31 Claims, No Drawings

ORGANIC COMPOSITIONS CONTAINING ESTERS OF ARYL AMINOARYLOXYALKANOLS

BACKGROUND OF THE INVENTION

This invention relates to new compositions of matter that are useful as antoxidants and to organic compositions and, in particular, lubricant compositions having the new compositions of matter therein to protect the organic compositions and lubricant compositions against oxidative deterioration.

Organic compositions such as mineral oils and lubricating compositions are subject to deterioration by oxidation and in particular are subject to such deterioration at high temperatures and when agitated in contact with air. Most lubricating oils, greases, and hydraulic fluids as well as many other organic compositions contain additives to inhibit the oxidation thereof.

In U.S. Pat. No. 3,492,234 to Harry J. Andress et al., there is described organic compositions that contain polyalkylated naphthols having up to 30 carbon atoms per alkyl group, which organic compositions possess high temperature antioxidant properties at temperatures of 600° F. and higher.

In U.S. Pat. No. 3,573,206 to Milton Braid et al., there is described lubricating compositions having improved antioxidant properties, which lubricating compositions contain oil-soluble products made by heating N-phenyl-naphthylamine, N-naphthyl-naphthylamine, mixtures thereof, or mixtures thereof with diphenylamines, in the presence of an oxidizing agent.

In U.S. Pat. No. 3,919,095 to Abraham O. M. Okorodudu there is described organic compositions that contain esters of phosphorodithioic acids to provide increased oxidation resistance and antiwear properties.

In U.S. Pat. No. 3,497,181 to Milton Braid there is described organic substances that are protected from oxidative deterioration by the presence therein of minor amounts of aryloxy(alkyloxy)alkane.

SUMMARY OF THE INVENTION

This invention is directed to a new composition of matter comprising an ester of an arylaminoaryloxyalkanol which arylaminoaryloxyalkanol is characterized by the formula:

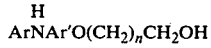

wherein:
  Ar and Ar' are individually selected from the group consisting of phenyl and naphthyl, and
  n is a number within the range of 1 to 12.
Other embodiments are directed to monobasic and dibasic acid esters of arylaminoaryloxyalkanols and to organic compositions and lubricant compositions containing the esters as antioxidants.

DESCRIPTION OF THE PREFERRED EMBODIMENTS

This invention is directed to new compositions of matter that are useful as antioxidants and to organic compositions and lubricant compositions containing the new compositions of matter to protect the organic and lubricant compositions from oxidative deterioration.

The antioxidants of this invention are particularly useful in organic compositions and lubricants containing ester base stocks.

Organic compositions which are formed in accordance with this invention by including therein minor amounts of the antioxidants of this invention include liquids and solids, mineral oils which are liquid products of petroleum within the viscosity range of products commonly called "oils", and lubricant compositions including oils and greases formed of mineral oils and synthetic oils. Examples of organic liquids and solids which have use in industrial applications and which are subject to deterioration when subjected to oxidation are oils and greases, power transmission fluids, resin and polymer coatings, and structural products.

The lubricant base of the lubricant composition of this invention may comprise liquid oils in the form of either a mineral oil or a synthetic oil or in the form of a grease in which any of the oils are employed as a vehicle. In general, mineral oils employed as a lubricant or grease vehicle may be of any suitable lubricating viscosity range, such as, for example, from about 45 SSU at 100° F. to about 6000 SSU at 100° F., and preferably from about 50 to about 250 SSU at 210° F. These oils may have viscosity indexes ranging to about 100 or higher. Viscosity indexes from about 70 to about 95 are preferred. The average molecular weights of these oils may range from about 250 to about 800. Where the lubricant is to be employed in the form of a grease, the lubricating oil is generally employed in an amount sufficient to balance the total grease composition after accounting for the desired quantity of the thickening agent and other additive components to be included in the grease formulation.

Typical synthetic oils which may be used in conjunction with this invention as lubricating oils or greases include polyisobutylene, polybutenes, hydrogenated polydecenes, polypropylene glycol, polyethylene glycol, trimethylolpropane esters, neopentyl and pentaerythritol esters, di(2-ethylhexyl) sebacate, di(2-ethylhexyl) adipate, dibutyl phthalate, fluorocarbons, silanes, esters of phosphorous-containing acids, liquid ureas, ferrocene derivatives, hydrogenated mineral oils, chain-type polyphenyls, siloxanes and silicones (polysiloxanes), alkyl-substituted diphenyl ethers typical of a butyl-substituted bis (p-phenoxy phenyl) ether, and phenoxy phenyl ethers. The antioxidants of this invention are particularly useful in ester base stocks such as those used in formulating jet aircraft turbine engine lubricants, refined petroleum lubricant base stocks, and mixtures thereof.

The novel compounds of this invention are esters of compounds described as arylaminoaryloxyalkanols, which compounds are represented by the structure I below:

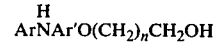

The esters of the arylaminoaryloxyalkanols may be derived from monobasic acids, in which case the esters are represented by the structure II below and may be derived from dibasic acids, in which case the structure of the esters is represented by structure III below:

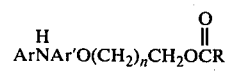

-continued $$ArNAr'O(CH_2)_nCH_2O\overset{O}{\overset{\|}{C}}R'\overset{O}{\overset{\|}{C}}OCH_2(CH_2)_nOAr'NAr \quad \text{III}$$
(with H on each N)

In the structures I, II, and III:
Ar and Ar' are individually selected from the group consisting of phenyl and naphthyl;
R is selected from the group consisting of alkyl groups of 1–12 carbon atoms of straight or branched chain having any isomeric composition and aralkyl group such as benzyl, phenethyl, phenylpropyl;
R' may be absent but when present is selected from the group consisting of alkylene groups having 1–8 carbon atoms of straight chain or containing side chains, arylene groups such as phenylene, alkylated phenylene and dialkylenephenylene, and alkylene substituted arylene groups; and
n is a number within the range of 1–12.

The arylaminoaryloxyalkanols of structure I may be prepared by reaction of a suitable hydroxy-substituted haloalkane with a hydroxy-substituted arylaminoarene in a suitable solvent such as N,N-dimethylformamide, N,N-dimethylacetamide, and dimethylsulfoxide in the presence of anhydrous sodium or potassium carbonate. The resulting hydroxy compounds are then subjected to esterification reactions with appropriate monobasic acids or dibasic acids such as acetic, propionic, butyric, pentanoic, pivalic, hexanoic, phenylacetic, phenylpropionic, oxalic, malonic, glutaric, succinic, adipic, suberic, phenylsuccinic, phthalic, terephthalic, 2-tertiary-octylterephthalic, and 4-tertiary-butylphthalic acids, or they may be subjected to transesterification reactions with methyl, ethyl, or other volatile alcohol esters of the foregoing acids. The resulting esters may be purified by distillation or recrystallization, or may in many cases be used as the crude reaction product after removal of unconsumed reactants and solvents.

These esters have utility as antioxidants or oxidation inhibitors when added to organic materials that are subject to oxidative deterioration. They are applicable for use as oxidation inhibitors in lubricants and are particularly applicable for use in ester base stocks such as are used in formulating jet aircraft gas turbine engine lubricants, refined petroleum lubricants, and mixtures thereof. Further examples of ester base lubricants into which the esters of this invention may be incorporated are the $C_5$ and $C_9$ carboxylic acid esters of hydrocarbons selected from the group consisting of pentaerythritol and trimethylolpropane. The esters of this invention provide oxidation protection to organic materials such as lubricants and ester base stocks when incorporated thereinto in useful concentrations. Such useful concentrations vary within the range of from about 0.1 weight percent to about 10 weight percent and preferred concentrations vary from about 0.2 weight percent to about 5 weight percent. These useful concentrations provide sufficient oxidation protection for most anticipated uses.

Catalytic oxidation tests were carried out to evaluate the compounds of this invention as oxidation inhibitors. These tests involved comparing the stability of a base stock of $C_5$ and $C_9$ esters of pentaerythritol with and without the compounds of this invention when exposed to oxidizing conditions at test temperatures of 450° F. for a test period of 24 hours in the presence of metal catalysts.

Catalytic Oxidation Test

In carrying out the catalytic oxidation test, a 25 ml. test sample in a glass apparatus is placed in a heating bath at the desired temperature. Present in the sample are the following materials which are either known to catalyze oxidation of organic substances, or are commonly used materials of construction, in an amount sufficient to provide the specified exposed surface area as indicated below:
(a) 15.6 square inches of sand-blasted iron wire;
(b) 0.78 square inch of polished copper wire;
(c) 0.87 square inch of polished aluminum wire; and
(d) 0.167 square inch of polished lead surface.

Dry air is passed through the heated sample at the rate of about 5 liters per hour for the specified duration of the test.

At the conclusion of the test, the increase in the acidity (NN) and kinematic viscosity (KV) resulting from the oxidation is measured. In addition, the loss in weight of the lead specimen is determined as an indication of corrosion and relative amounts of visual sludge are observed.

The results of these tests are given in TABLE I below:

TABLE I

24 Hr., 450° F., $C_5$ and $C_9$ esters of pentaerythritol

| Additive of Example No. | Conc. Wt. % | ΔNN % | ΔKV % | PB Loss Mg. | Sludge |
|---|---|---|---|---|---|
| None | — | 8.25 | 586 | 13.7 | Trace |
| 1. Ph-NH-Ph-O(CH$_2$)$_6$OCC(CH$_3$)$_3$ (with C=O) | 2 | 1.3 | 55 | 12.9 | Nil |
|    6-(p-anilinophenoxy)hexyl pivalate | 1 | 5.1 | 413 | 9 | Mod. |
| 2. Ph-NH-Ph-O(CH$_2$)$_6$OC(CH$_2$)$_6$CO(CH$_2$)$_6$O-Ph-NH-Ph | 2 | 3.7 | 211 | 4.7 | Nil |
|    di-6-(p-anilinophenoxy)hexyl suberate | 1 | 4.9 | 188 | 5.4 | Trace |
| 3. Ph-NH-Ph-O(CH$_2$)$_6$OCCO(CH$_2$)$_6$O-Ph-NH-Ph | 2 | 3 | 62 | 7.9 | Light |
|    di-6-(p-anilinophenoxy)hexyl oxalate | 1 | 4.3 | 101 | 5.5 | Light |

TABLE I-continued

| | 24 Hr., 450° F., C₅ and C₉ esters of pentaerythritol | | | | |
|---|---|---|---|---|---|
| Additive of Example No. | Conc. Wt. % | ΔNN % | ΔKV % | PB Loss Mg. | Sludge |
| 4. 3-(p-anilinophenoxy)propyl hexanoate | 2 | 2 | 45 | 7 | Trace |
| | 1 | 3.45 | 61 | 9.5 | Trace |
| 5. 3-(p-anilinophenoxy)propyl octanoate | 1 | 2.5 | 75 | 8.8 | Nil |
| 6. 6-(p-anilinophenoxy)hexyl hexanoate | 2 | 1.7 | 52 | 4.6 | Nil |
| | 1 | 2.9 | 73 | 9.7 | Nil |
| 7. 6-(p-anilinophenoxy)hexyl octanoate | 2 | 1.8 | 52 | 7.7 | Nil |
| | 1 | 2.2 | 64 | 7.2 | Nil |
| 8. 3-(p-anilinophenoxy)propyl hexanoate and N-phenyl-1-naphthylamine | 1 } 1 | 1.2 | 45 | 5.4 | Mod. |
| 9. 3-(p-anilinophenoxy)propyl octanoate and N-phenyl-1-naphthylamine | 1 } 1 | 1.5 | 50 | 8.2 | Light |
| 10. 6-(p-anilinophenoxy)hexyl hexanoate and N-phenyl-1-naphthylamine | 1 } 1 | 1.1 | 43 | 3 | Trace |
| 11. 6-(p-anilinophenoxy)hexyl octanoate and N-phenyl-1-naphthylamine | 1 } 1 | 2.2 | 45 | 3.5 | Mod. |
| 12. N-phenyl-1-naphthylamine | 2 | 3.6 | 82 | 0.2 | Light |

The data of TABLE I illustrates the utility of the esters of this invention as antioxidants.

The invention is further illustrated by the following Examples:

EXAMPLE 1

A mixture of 6-(p-anilinophenoxy)hexanol (28.5 g.) and methyl pivalate (34.5 g.) to which 0.3 g. of aluminum isopropylate and a small chip of sodium metal had been added was heated at 88° C. while stirring for about 3 hours. Gas chromatography indicated that transesterification was not complete. Methyl pivalate was distilled from the reaction allowing the temperature to rise to 160° C. and was then added slowly back to the mixture at such a rate that the temperature could be maintained at 175°-185° C. After two hours, the reaction mixture was stripped of volatiles by heating at 120° C. under reduced pressure (150 mm of mercury). The solid residue obtained on cooling was recrystallized from 2-propanol to afford the ester, 6-(p-anilinophenoxy)hexyl pivalate as a crystalline solid, m.p. 64°-65° C.

Anal. Calc'd. for $C_{23}H_{31}O_3N$: C, 74.76; H, 8.46; N, 3.79. Found: C, 73.59; H, 8.12; N, 4.07.

EXAMPLE 2

Following the method of Example 1, a mixture of 6-(p-anilinophenoxy)hexanol (42.8 g.) and dimethyl suberate (15.2 g.) was heated with catalytic amounts of aluminum isopropylate and sodium metal at 160°-205° for several hours. The solids obtained on cooling the reaction mixture were recrystallized from 2-propanol to afford the diester, di-6-(p-anilinophenoxy)hexyl suberate, as a crystalline solid, m.p. 90°-92° C.

Anal. Calc'd. for $C_{44}H_{56}O_6N_2$: C, 74.55; H, 7.96; N, 3.95. Found: C, 73.35; H, 7.61; N, 3.82.

EXAMPLE 3

Following the procedure of Example 1, 21.4 g. of 6-(p-anilinophenoxy)hexanol and 4.4 g. of dimethyl oxalate were heated with catalytic amounts of sodium metal and aluminum isopropylate at 170°-180° C. for about 12 hours. The reaction mixture was cooled and extracted with ether. The extract was washed with aqueous sodium bicarbonate solution, then with water and dried. Removal of the ether solvent left a soft solid from which the diester, di-6-(p-anilinophenoxy)hexyl oxalate, was obtained as a crystalline solid, m.p. 52°-53° C. with an infrared spectrum consistent with the diester structure.

EXAMPLE 4

Following the method of Example 1 using a mixture of sodium metal and aluminum isopropylate catalysts, the reaction of 24.3 g. of 3-(p-anilinophenoxy)propanol with 13 g. of methyl hexanoate was carried out at 140°-145° C. for several hours. The reaction mixture was dissolved in petroleum ether, washed with sodium bicarbonate solution and then with water and dried. After removal of solvent, the residue was recrystallized from isooctane to isolate the ester, 3-(p-anilinophenoxy)propyl hexanoate as a crystalline solid, m.p. 50°-51° C.

Anal. Calc'd. for $C_{21}H_{27}O_3N$: C, 73.87; H, 7.97; N, 4.10. Found: C, 74.24; H, 7.85; N, 4.08.

EXAMPLE 5

A solution of 28.8 g. of octanoic acid and 48.6 g. of 3-(p-anilinophenoxy)propanol in 200 ml. of benzene was saturated with hydrogen chloride and the reaction was heated at reflux for 4 hours with removal of azeotropically distilled water. The benzene solution was washed with water, sodium bicarbonate aqueous solution, and then again with water. After drying, benzene solvent was removed, and the ester 3-(p-anilinophenoxy)propyl octanoate was recrystallized from the residue in isooctane as a crystalline solid, m.p. 45°-46° C.

Anal. Calc'd. for $C_{23}H_{31}O_3N$: C, 74.76; H, 8.46; N, 3.79. Found: C, 74.66; H, 8.48; N, 3.78.

EXAMPLE 6

By the method of Example 1, 28.5 g. of 6-(p-anilinophenoxy)hexanol and 39 g. of methyl hexanoate were heated together at 145°-150° C. with catalytic amounts of sodium metal and aluminum isopropylate for about 5.5 hours. The reaction mixture was taken up in petroleum ether and worked up with washing by base and removal of solvent. The residue was percolated through alumina in benzene solution and the benzene was removed from the eluent. The ester, 6-(p-anilinophenoxy)hexyl hexanoate, remained as an oil; it was not recrystallized.

Anal. Calc'd. for $C_{24}H_{33}O_3N$: C, 75.16; H, 8.67; N, 3.65. Found: C, 75.51; H, 8.65; N, 3.56.

EXAMPLE 7

Following the method of Example 1, a mixture of 28.5 g. of 6-(p-anilinophenoxy)hexanol, 47.5 g. of methyl octanoate, 0.3 g. of aluminum isopropylate and a small chip of sodium metal (about 0.1 g.) was heated at 160°–170° C. for a total of 9 hours. The reaction mixture was then cooled and recrystallized from 2-propanol to afford the ester, 6-(p-anilinophenoxy)hexyl octanoate as a crystalline solid, m.p. 42°–43° C.

Anal. Calc'd. for $C_{26}H_{37}O_3N$: C, 75.87; H, 9.06; N, 3.40. Found: C, 76.18; H, 8.75; N, 3.51.

I claim:

1. A new composition of matter comprising an ester of an arylaminoaryloxyalkanol, said arylaminoaryloxyalkanol being characterized by the formula:

$$\mathrm{ArNAr'O(CH_2)_nCH_2OH}$$
$$\overset{H}{|}$$

wherein:
Ar and Ar' are individually selected from the group consisting of phenyl and naphthyl; and
n is a number within the range of 1 to 12.

2. The composition of matter of claim 1 wherein said ester of an arylaminoaryloxyalkanol is derived from a monobasic acid, said ester being characterized by the formula:

$$\overset{H}{\mathrm{ArNAr'O(CH_2)_nCH_2O}}\overset{O}{\overset{\|}{\mathrm{C}}}\mathrm{R}$$

wherein:
Ar and Ar' are individually selected from the group consisting of phenyl and naphthyl; and
n is a number within the range of 1 to 12; and
R is selected from the group consisting of alkyl groups of 1 to 12 carbon atoms of straight or branched chain and aralkyl groups.

3. The composition of matter of claim 2 wherein said ester is 6-(p-anilinophenoxy)hexyl pivalate.

4. The composition of matter of claim 2 wherein said ester is 3-(p-anilinophenoxy)propyl hexanoate.

5. The composition of matter of claim 2 wherein said ester is 3-(p-anilinophenoxy)propyl octanoate.

6. The composition of matter of claim 2 wherein said ester is 6-(p-anilinophenoxy)hexyl hexanoate.

7. The composition of matter of claim 2 wherein said ester is 6-(p-anilinophenoxy)hexyl octanoate.

8. The composition of matter of claim 1 wherein said ester of an arylaminoaryloxyalkanol is derived from a dibasic acid, said ester being characterized by the formula:

$$\overset{H}{\mathrm{ArNAr'O(CH_2)_nCH_2O}}\overset{O}{\overset{\|}{\mathrm{C}}}\mathrm{R'}\overset{O}{\overset{\|}{\mathrm{C}}}\mathrm{OCH_2(CH_2)_nOAr'N}\overset{H}{\mathrm{Ar}}$$

wherein:
Ar and Ar' are individually selected from the group consisting of phenyl and naphthyl;
n is a number within the range of 1 to 12; and
R' may be absent but when present is selected from the group consisting of alkylene groups having 1 to 8 carbon atoms of straight chain or containing side chains, arylene groups, and alkylene substituted arylene groups.

9. The composition of matter of claim 8 wherein said ester is di-6-(p-anilinophenoxy)hexyl suberate.

10. The composition of matter of claim 8 wherein said ester is di-6-(p-anilinophenoxy)hexyl oxalate.

11. A composition of matter comprising a mixture of an ester of an arylaminoaryloxyalkanol and a diarylamine.

12. The composition of matter of claim 11 wherein said diarylamine is N-phenyl-1-naphthylamine.

13. The composition of matter of claim 12 wherein said ester is 3-(p-anilinophenoxy)propyl hexanoate.

14. The composition of matter of claim 12 wherein said ester is 3-(p-anilinophenoxy)propyl octanoate.

15. The composition of matter of claim 12 wherein said ester is 6-(p-anilinophenoxy)hexyl hexanoate.

16. The composition of matter of claim 12 wherein said ester is 6-(p-anilinophenoxy)hexyl octanoate.

17. An organic composition comprising a major amount of an organic material subject to oxidative deterioration and a minor and sufficient amount of an oxidation inhibitor to inhibit the oxidation of said organic material, said oxidation inhibitor being an ester of an arylaminoaryloxyalkanol, said ester being derived from a monobasic acid characterized by the following formula:

$$\overset{H}{\mathrm{ArNAr'O(CH_2)_nCH_2O}}\overset{O}{\overset{\|}{\mathrm{C}}}\mathrm{R}$$

wherein
Ar and Ar' are individually selected from the group consisting of phenyl and naphthyl;
n is a number within the range of 1 to 12; and
R is selected from the group consisting of alkyl groups of 1 to 12 carbon atoms of straight or branched chain and aralkyl groups.

18. The organic composition of claim 17 wherein said ester is 6-(p-anilinophenoxy)hexyl pivalate.

19. The organic composition of claim 17 wherein said ester is 3-(p-anilinophenoxy)propyl hexanoate.

20. The organic composition of claim 17 wherein said ester is 3-(p-anilinophenoxy)propyl octanoate.

21. The organic composition of claim 17 wherein said ester is 6-(p-anilinophenoxy)hexyl hexanoate.

22. The organic composition of claim 17 wherein said ester is 6-(p-anilinophenoxy)hexyl octanoate.

23. The organic composition of claim 17 wherein said oxidation inhibitor is a mixture of 3-(p-anilinophenoxy)propyl hexanoate and N-phenyl-1-naphthylamine.

24. The organic composition of claim 17 wherein said oxidation inhibitor is a mixture of 3-(p-anilinophenoxy)propyl octanoate and N-phenyl-1-naphthylamine.

25. The organic composition of claim 17 wherein said oxidation inhibitor is a mixture of 6-(p-anilinophenoxy)hexyl hexanoate and N-phenyl-1-naphthylamine.

26. The organic composition of claim 17 wherein said oxidation inhibitor is a mixture of 6-(p-anilinophenoxy)hexyl octanoate and N-phenyl-1-naphthylamine.

27. The organic composition of claim 17 wherein said organic material is a lubricant composition and wherein said ester of an arylaminoaryloxyalkanol is selected from the group consisting of 6-(p-anilinophenoxy)hexyl pivalate, 3-(p-anilinophenoxy)propyl hexanoate, 3-(p- anilinophenoxy)propyl octanoate, 6-(p-anilinophenoxy)hexyl hexanoate, 6-(p-anilinophenoxy)hexyl octanoate, 3-(p-anilinophenoxy)propyl hexanoate and N-phenyl-1-naphthylamine, 3-(p-anilinophenoxy)propyl octanoate and N-phenyl-1-naphthylamine, 6-(p-anilinophenoxy)hexyl hexanoate and N-phenyl-1-naphthylamine, and 6-(p-anilinophenoxy)hexyl octanoate and N-phenyl-1-naphthylamine and mixtures thereof.

28. The organic composition of claim 27 wherein said lubricant composition is an ester base lubricant.

29. An organic composition comprising a major amount of an organic material subject to oxidative deterioration and a minor and sufficient amount of an oxidation inhibitor to inhibit the oxidation of said organic material, said oxidation inhibitor being an ester of an arylaminoaryloxyalkanol, said ester being derived from a dibasic acid and characterized by the formula:

$$\underset{H}{ArNAr'}O(CH_2)_nCH_2O\underset{\overset{\|}{O}}{C}R'\underset{\overset{\|}{O}}{C}OCH_2(CH_2)_nOAr'N\underset{H}{Ar}$$

wherein:
Ar and Ar' are individually selected from the group consisting of phenyl and naphthyl;
n is a number within the range of 1 to 12; and
R' may be absent but when present is selected from the group consisting of alkylene groups having 1 to 8 carbon atoms of straight chain or containing side chains, arylene groups, and alkylene substituted arylene groups.

30. The organic composition of claim 29 wherein said organic material is an ester base lubricant and wherein said ester is di-6-(p-anilinophenoxy)hexyl suberate.

31. The organic composition of claim 29 wherein said organic material is an ester base lubricant and wherein said ester is di-6-(p-anilinophenoxy)hexyl oxalate.

* * * * *